Aug. 11, 1936.                F. C. HOWARD                2,050,435
                            AUTOMOBILE BUMPER
                    Filed June 28, 1933          2 Sheets-Sheet 1
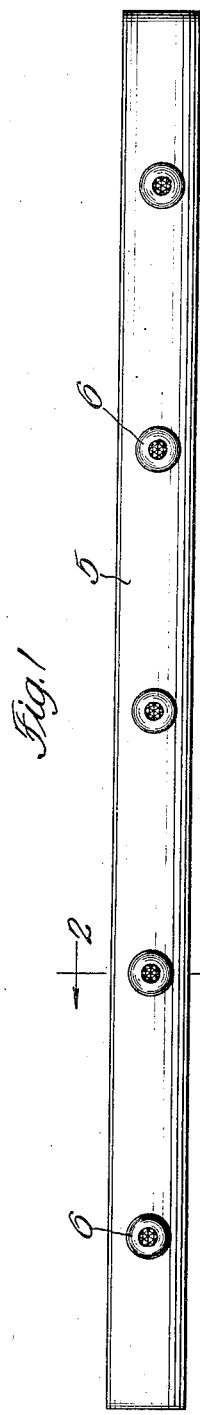
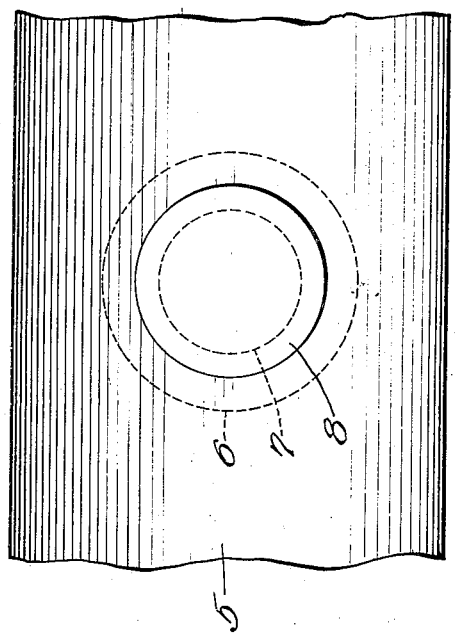
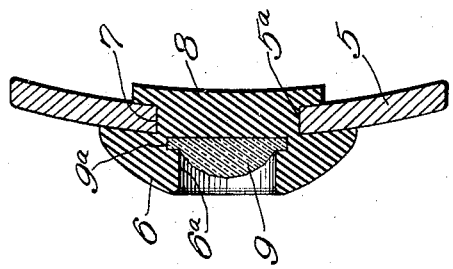
INVENTOR:-
Frank C. Howard
BY Stevens + Batchelor
ATTORNEYS.

Aug. 11, 1936.  F. C. HOWARD  2,050,435
AUTOMOBILE BUMPER
Filed June 28, 1933   2 Sheets-Sheet 2
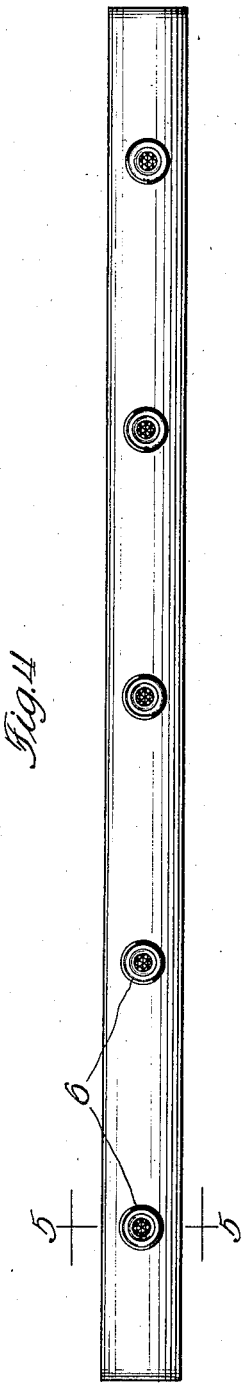
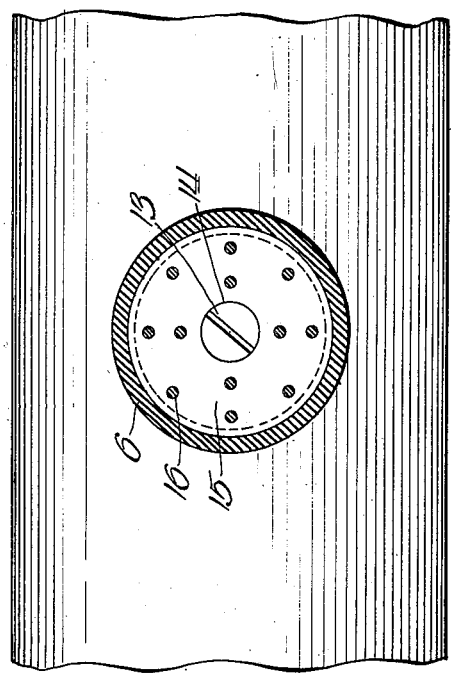
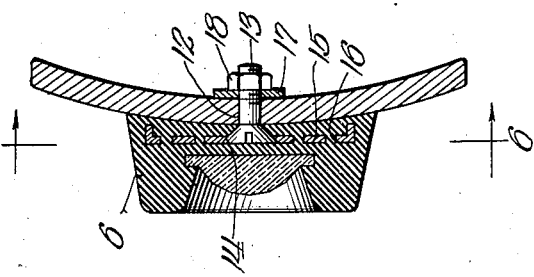
INVENTOR:-
Frank C. Howard
BY Stevens & Batchelor
ATTORNEYS.

Patented Aug. 11, 1936

2,050,435

UNITED STATES PATENT OFFICE 2,050,435

AUTOMOBILE BUMPER

Frank C. Howard, Chicago, Ill., assignor to American Automatic Devices Co., Chicago, Ill., a corporation of Illinois Application June 28, 1933, Serial No. 678,096
2 Claims. (Cl. 88—81)

My invention relates to automobile bumpers, and more particularly to means for cushioning the same against shock and damage, and my main object is to equip the standard bumper with a set of units which serve as cushioning elements when making contact with other bumpers or objects to eliminate shock and injury to the same.

Another object of the invention is to incorporate in the novel cushioning element a set of reflector jewels for purposes of signal and attraction.

An additional object of the invention is to construct the novel cushioning element with utmost simplicity and for easy application and removal relative to the bumper.

With the above objects in view and any others that may suggest themselves from the specification and claims to follow, a better understanding of the invention may be had by reference to the accompanying drawings, in which—

Fig. 1 is a front elevation of a typical bar bumper showing a set of the cushion elements applied;

Fig. 2 is an enlarged cross section on the line 2—2 of Fig. 1;

Fig. 3 is an enlarged fragmental view of the bumper from the rear in the zone of the cushioning element;

Fig. 4 is an elevation of a modification;

Fig. 5 is an enlarged section on the line 5—5 of Fig. 4, and

Fig. 6 is a section on the line 6—6 of Fig. 5.

Referring specifically to the drawings, 5 denotes a typical bar bumper, and I have chosen to equip the same with a longitudinal series of cushioning elements set midway between the top and bottom of the bumper, so as to be most prominently in the zone of bumper contact.

Each of the cushioning elements is a solid block of soft rubber, being made with a frontal head 6, a medial neck 7 and a rear disc 8. The bumper is formed with a perforation 5a at the point of application of each cushioning element, this perforation being of the same diameter as the neck 7 of the element. Thus it is feasible to attach one of the cushioning elements by forcing the disc through the perforation 5a so as to overlie the inner side thereof, as clearly shown in Figs. 2 and 3. The device is thus firmly anchored to the bumper and requires no other attaching means.

The head 6 of the cushion element is of considerable thickness and serves as a cushion when making impact with the bumper of another car or any other object, saving the same from being marred, and at the same time absorbing the shock of impact. When any of the elements mounted on a given bumper become worn, deformed or otherwise damaged, it is a simple matter to remove them by pulling out from the front and replacing them with new cushioning elements.

I prefer to make a frontal cavity 6a in the head portion of the element and deposit therein a reflector jewel 9 of the type usually termed as reflector buttons and carried by automobile bodies and bumpers. The marginal portion 9a of the jewel is firmly imbedded in the stock of the cushioning element so that no other securing means for the jewel is required. The jewel is easily visible from the front of the bumper, and a set of jewels as arranged in Fig. 1 forms an attractive and effective signal when receiving the light from an approaching car.

In the modification, I have designed the cushioning element for attachment to the bumper by means of a bolt. Thus, but a small hole 12 is made in the bumper where each unit is applicable, to receive the shank 13 of the bolt. The head of the latter is molded in the stock of the cushioning element 6 and seats in the center perforation 14 of a steel disc 15 also molded in the stock of the head 6. The disc is made with other perforations 16 for communication with the head stock to more firmly bind the disc to the same.

After the unit has been applied to the bumper, the bolt shank portion which extends rearwardly from the bumper receives a washer 17 and a nut 18 to firmly secure the unit to the bumper. The modified attachment eliminates the need of forming the bumper with relatively large openings and thereby weakening it. Also, in the modified embodiment the cavity for the reflector jewel is outwardly flared, as clearly shown in Fig. 5, to allow more light to reach the jewel.

It will be seen that I have provided an attachment of extreme simplicity and great usefulness to the standard bumper, since both the functions of a shock absorber and reflector signal are had with the feature of easy application and removal.

I claim:—

1. A device of the type described, comprising in combination a metal disc, a body of yielding material surrounding said disc with a substantial thickness of the yielding material in rear of said disc, a bolt connected with said disc with its shank portion extending out through the back face of the body of yielding material, and a reflector jewel secured in an undercut socket in the front face of the body with a substantial thickness of the yielding material between the jewel and the disc.

2. A device of the type described, comprising in combination a metal disc having a series of openings therethrough, a body of yielding material surrounding said disc and extending through said openings so as to be securely bonded to the disc and having a substantial thickness of the yielding material in rear of the disc, a headed bolt extending through an opening in said disc and out through the back face of the body of yielding material and held securely in position in the disc by the engagement of the head portion with the yielding material of said body in front of said disc, and a reflector jewel secured in an undercut socket in the front face of the body in backwardly spaced relation to the front face of the body with a substantial thickness of the yielding material between the jewel and the disc.

FRANK C. HOWARD.